Dec. 13, 1960    F. P. BALDWIN ET AL    2,964,489
PROCESS OF CHLORINATING BUTYL RUBBER AND
VULCANIZING THE CHLORINATED PRODUCT
Filed July 16, 1956    2 Sheets-Sheet 1
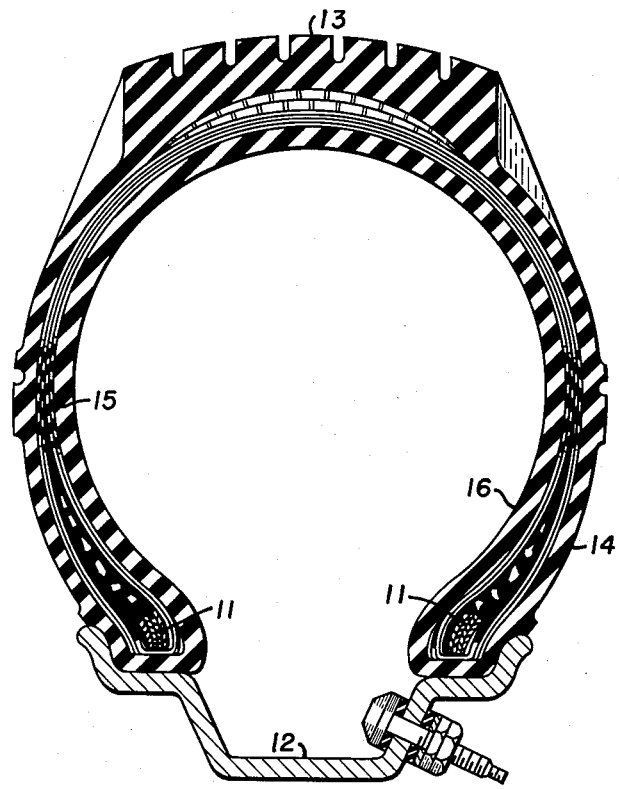
FIG. I
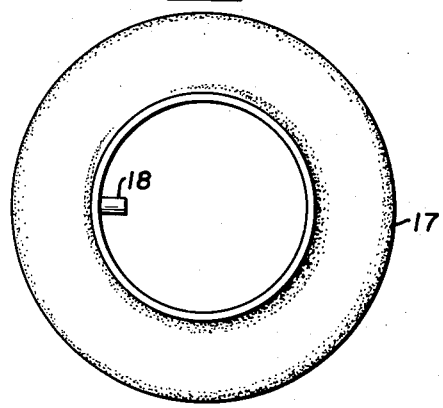
FIG. 2
Francis P. Baldwin
Robert M. Thomas    Inventors
By *W. H. Smyers*    Attorney Dec. 13, 1960 F. P. BALDWIN ET AL 2,964,489
PROCESS OF CHLORINATING BUTYL RUBBER AND
VULCANIZING THE CHLORINATED PRODUCT
Filed July 16, 1956 2 Sheets-Sheet 2

Francis P. Baldwin
Robert M. Thomas   Inventors
By *W. H. Smyers*   Attorney

United States Patent Office 2,964,489
Patented Dec. 13, 1960

2,964,489

PROCESS OF CHLORINATING BUTYL RUBBER AND VULCANIZING THE CHLORINATED PRODUCT

Francis P. Baldwin, Colonia, and Robert M. Thomas, Westfield, N.J., assignors to Esso Research and Engineering Company, a corporation of Delaware Filed July 16, 1956, Ser. No. 597,993

9 Claims. (Cl. 260—41.5)

This invention relates to vulcanizable rubbery polymeric compositions which are partially chlorinated (hereinafter referred to as "chlorinated") copolymers of isoolefins and multiolefins and to the preparation and use of such compositions. It also relates to compositions containing chlorinated copolymers of isoolefins and multiolefins together with other rubbery materials, such as synthetic and natural rubbers. The rubbery copolymers of the present invention generally contain a major proportion, preferably at least 85 wt. percent of isoolefins and a minor proportion, preferably not more than about 15 wt. percent of multiolefins.

The present invention is a continuation-in-part of U.S. patent application Ser. No. 512,182, filed May 31, 1955, in the names of Francis P. Baldwin and Robert M. Thomas.

The invention will be best understood from the following description read in connection with the accompanying drawings, wherein:

Figure 1 is a vertical section of a pneumatic tubeless tire employing therein a modified isoolefin-multiolefin-containing copolymer in accordance with the present invention;

Figure 2 is a view in side elevation of a tire casing curing bag, formed of a material comprising a modified copolymer in accordance with the present invention;

Figure 3:
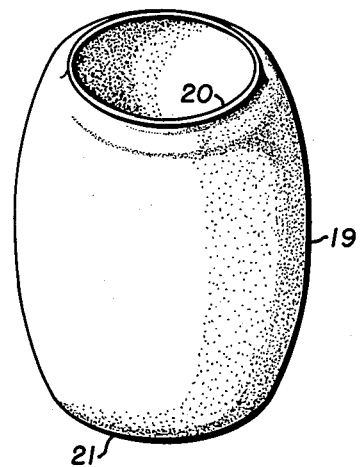
Figure 3 is a perspective view of a tire casing curing diaphragm or bladder as provided in the structure of a Bag-O-Matic press and containing therein a modified copolymer in accordance with the present invention.

Copolymers of the general type hereinbefore mentioned, which are desirably reacted with chlorine or chlorine-containing compounds in accordance with the invention, especially where the copolymer contains about 85 to 99.5 weight percent of a $C_4$ to $C_8$ isoolefin such as isobutylene, 2-methyl butene-1 or 3-methyl butene-1, etc., with about 15 to 0.5 weight percent of a multiolefin of about 4 to 14, preferably about 4 to 6 carbon atoms, are commonly referred to in patents and technical literature as "butyl rubber" or GR-I rubber (Government Rubber-Isobutylene) and, for example, is referred to as "butyl rubber" in patents and in textbook "Synthetic Rubber" by G. S. Whitby. The preparation of butyl rubber is also described in U.S. Patent 2,356,128 to Thomas et al. and in U.S. application Ser. No. 512,182, filed May 31, 1955, to Baldwin et al. As hereinbefore mentioned, the rubber comprises at least a major proportion of the reaction product of a $C_4$ to $C_8$ isoolefin (preferably isobutylene) with a conjugated diolefin such as isoprene, butadiene, dimethyl butadiene, piperylene, or such multiolefins as cyclopentadiene, cyclohexadienes, dimethallyl, alloocymene, vinyl fulvenes, etc. The substantially oxygen-free reaction product comprising isobutylene and isoprene is preferred although the copolymer may contain about 0.1 to 20.0, preferably about 0.2 to 5.0 parts by weight based on total reacting comonomers of such monoolefinic compounds as styrene, p-methyl styrene, alpha methyl styrene, indene, dihydronaphthalene, p-chlorostyrene, dichlorostyrene, mixtures thereof, etc.

As explained in the parent application, Serial No. 512,182, heretofore it has not been possible to produce rubbery isoolefin-multiolefin-containing copolymers, particularly butyl rubber which are curable with certain basic metal compounds such as bivalent metal oxides (preferably zinc oxide) in the absence of sulfur without producing a rubber which does not withstand heat aging and/or is degraded into a polymer of undesirably low molecular weight. It has also not been possible to produce heat stable butyl rubbers (which are not degraded as to molecular weight) which are convulcanizable with or without added sulfur with certain highly unsaturated rubbers such as natural rubber and synthetic rubbers such as GR-S rubber, Buna-N rubber, neoprene rubber, etc.

As disclosed and claimed in the parent application, U.S. application Ser. No. 512,182, it is now possible to produce rubbery isoolefin-multiolefin-containing copolymers, particularly butyl type rubbery copolymers which are covulcanizable with more highly unsaturated rubbers by chlorinating the rubber in a manner which does not degrade the molecular weight thereof, but sufficiently to produce a rubber which when vulcanized retains its tensile strength upon heat aging. Such chlorinated isoolefin-multiolefin-containing rubbery copolymers are readily covulcanizable with more highly unsaturated rubbers with or without added sulfur to produce rubbery products of excellent heat aging resistance. In the case of butyl rubber, the chlorinated butyl rubber so formed does not greatly differ in curing rate as compared to natural rubber and synthetic rubbers such as GR-S rubber and thus, as pointed out above, may be covulcanized therewith by the use of zinc oxide and/or sulfur or other known vulcanizing agents.

By the processes disclosed and claimed in the parent application, rubbery materials of the type of butyl rubber are chlorinated so as to contain about at least 0.5 wt. percent (preferably at least about 1.0 wt. percent) combined chlorine but not more than about "X" wt. percent combined chlorine wherein:

$$X = \frac{35.46L}{(100-L)M_1 + L(M_2 + 35.46)} \times 100$$

and:

$L$ = mole percent of the multiolefin in the polymer
$M_1$ = molecular weight of the isoolefin
$M_2$ = molecular weight of the multiolefin
$35.46$ = atomic weight of chlorine Restated, there should be at least about 0.2 and preferably at least about 0.5 weight percent of combined chlorine in the polymer but not more than about three atoms of chlorine combined in the polymer per two double bonds and preferably not more than about one atom of combined chlorine per double bond in the polymer. In other words, the mole percent of combined chlorine should be about 0.20 to 1.0, preferably about 0.25 to 0.60 times the mole percent unsaturation of the polymer.

In accordance with the present invention, the chlorination of the butyl rubber (or other isoolefin-multiolefin-containing copolymers) is accomplished by contacting the predissolved rubbery copolymer directly with gaseous chlorine until the above-described amount of chlorine is combined.

The chlorination according to the invention is conducted at temperatures above about 0° C. up to about +100° C., advantageously at about 10° to 80° C., preferably at about 20° to 70° C. (room temperature being satisfactory) for a few seconds to several hours. An advantageous pressure range is from about 0.5 to 200 p.s.i.a.; atmospheric pressure being satisfactory. The chlorination conditions are regulated to chlorinate the rubbery copolymer to the extent hereinbefore mentioned. For example, if the butyl rubber corresponds to GR–I–18 rubber it is preferably chlorinated to contain about 0.2 to 2.5%, advantageously about 0.5 to 2.0%, preferably about 0.8 to 1.8% combined chlorine.

The butyl rubber or other rubbery isoolefin-multiolefin-copolymers may be dissolved in any suitable substantially inert liquid organic solvent such as a substantially inert hydrocarbon or halogenated derivatives of substantially inert hydrocarbons; examples of which are hexane, heptane, pentane, naphtha, branched chain paraffins, straight run mineral spirits, cyclohexane, cyclopentane, alkyl substituted cycloparaffins, benzene, toluene, chlorobenzene, chloroform, trichloroethane, carbon tetrachloride, etc.

The preferred solvents are $C_3$ to $C_{12}$, preferably $C_4$ to $C_8$, and even more especially $C_5$ to $C_7$ substantially inert hydrocarbons such as cyclohexane, cyclopentane, methyl pentanes, dimethyl butanes, isopentanes, isoheptanes, methyl cyclopentane, toluene, and especially n-hexane, n-heptane, n-pentane, benzene, or admixtures thereof.

Typical mixtures of the foregoing hydrocarbon solvents are as follows:

Mixture 1

| Component: | Volume percent |
| --- | --- |
| 2-methyl pentane | 1.7 |
| 3-methyl pentane | 12.4 |
| n-Hexane | 55.4 |
| Methyl cyclopentane | 20.2 |
| Benzene | 7.9 |
| Cyclohexane | 2.4 |
| | 100.0 |

Mixture 2

| Component: | Volume percent |
| --- | --- |
| 2,2-dimethyl butane | 0.1 |
| 2,3-dimethyl butane | 2.5 |
| 2-methyl pentane | 19.8 |
| 3-methyl pentane | 12.5 |
| n-Hexane | 34.3 |
| Methyl cyclopentane | 20.8 |
| 2,2-dimethyl pentane | 0.8 |
| Benzene | 7.5 |
| Cyclohexane | 1.7 |
| Total | 100.0 |

The concentration of the butyl rubber in the solvent will depend upon the type of reactor, molecular weight of the butyl rubber, etc. In general, the concentration of a rubbery copolymer having a viscosity average molecular weight of about 50,000 to about 2,000,000, if the solvent is a substantially inert hydrocarbon, will be between 1 and 80% by weight, preferably about 5 to 50%.

The chlorine gas may also be diluted with up to about 50 times its volume, preferably about 0.1 to 5.0 times its volume of an inert gas such as nitrogen, methane, ethane, carbon dioxide, etc.

In practicing the present invention, in batch procedure, the gaseous chlorine is preferably added relatively slowly to a preformed solution of the butyl rubber with agitation, the solution being regulated to a temperature of between about 10° and 100° C. The chlorine is advantageously added over a period of about 1 to 60 minutes depending upon the degree of agitation.

For a continuous process, the preformed butyl rubber solution and gaseous elemental chlorine are preferably contacted in an orifice mixing zone or preferably a multiple orifice mixing zone of any commercially available type wherein the butyl solution passes consecutively through a plurality of orifices. The chlorine gas is advantageously bubbled into the butyl rubber solution at one or more points, however preferably at least at the first orifice passed through by the butyl solution.

Alternatively a plurality of agitated reaction zones in series may be employed wherein the chlorine is added to the first zone or the process staged so as to increase the chlorine content in each zone to the final chlorine concentration desired. Alternatively the chlorine gas may be introduced into the solution of the rubbery copolymer at one or a plurality of points at the suction end of a pumping means such as a centrifugal pump wherein complete mixing and substantially complete reaction of the chlorine gas and the copolymer solution takes place.

Regardless of the type of chlorination process, the amount of chlorine added to a butyl rubber dissolved in a completely inert hydrocarbon is approximately twice that which is desired to be combined with the butyl polymer, since for one mole of chlorine, approximately one atom combines with the polymer and the other atom is evolved as hydrogen chloride.

The resulting chlorinated butyl rubber polymer may be recovered in various manners. The polymer may be precipitated with alcohols or acetone or any other known non-solvent for the rubber and dried under about 1 to 760 millimeters or higher of mercury pressure absolute at temperature levels of between about 0° to 180° C., preferably about 50° to 150° C. (e.g. 70° C.). Other methods of recovering the chlorinated butyl polymer from the hydrocarbon solution of the same are by conventional spray or drum drying techniques. Alternatively the chlorinated butyl rubber containing solution may be contacted with steam and/or preferably injected into a vessel containing agitated water heated to a temperature sufficient to flash off the hydrocarbon solvent and form an aqueous slurry of the chlorinated butyl rubber. The chlorinated butyl rubber may then be separated from this slurry by filtration, dried and recovered as a "crumb" or as a dense sheet or slab by conventional milling and/or extruding procedures.

The resulting chlorinated butyl rubber polymer is similar to ordinary butyl rubber as to rubbery characteristics. It also has the property of being curable with zinc oxide and/or sulfur with or without added vulcanization accelerators such as thiuram polysulfides or other derivatives of thiocarbamic acids. The cure for example may be accomplished in the presence of such compositions as (1) zinc oxide, (2) zinc oxide and sulfur, (3) zinc oxide and tetramethyl thiuram disulfide, (4) sulfur and a zinc dialkyl polythiocarbamate, (5) tetramethyl thiuram disulfide, (6) tellurium diethyl dithiocarbamate, (7) a lead oxide and p-quinone dioxime with or without sulfur, (8) benzothiazyl disulfide and p-quinone dioxime, with or without sulfur, (9) p-quinone dioxime dibenzoate, a lead oxide, and sulfur; (10) organic primary or polyfunctional amines with or without magnesium oxide, etc. In general, the curing procedures as outlined in U.S. patent application Serial No. 512,182 are satisfactory. For instance, for vulcanization purposes, the chlorinated butyl rubber copolymer is advantageously compounded with about:

| Component | General Range | Preferred Range |
|---|---|---|
| Carbon black | 0-150 | 25-75 |
| Zinc oxide | 1-50 | 2-30 |
| Mold release agent (e.g. stearic acid) | 0-5 | 0-2 |
| Sulfur | 0-10 | 0-5 |
| Accelerator (e.g. tetramethyl thiuram disulfide) | 0-5 | 0-2 |
| Antioxidant (e.g. N-lauroyl p-amino phenol) | 0-5 | 0-2 |

The chlorinated copolymer formed advantageously has a viscosity average molecular weight between about 50,000 or 250,000 to about 2,000,000 and a mole percent unsaturation between about 0.3 to 50.0, preferably 0.5 to 10.0. This copolymer, when cured, has a good elastic limit, tensile strength, abrasion resistance and flexure resistance. For vulcanization purposes, as well as the above components, the rubbery copolymer before curing may be further compounded with various mineral fillers such as clays, silica, talc, diatomaceous earth, barytes, lithopone, or titanium dioxide as well as with waxes, tars, resins, organic esters or plasticizers which are preferably hydrocarbon plasticizer oils. If desired, other modifying agents such as medium or high molecular weight (e.g. 30,000 to 150,000 Staudinger) polyolefins such as polyisobutylene, may be added prior to vulcanization. In general, the amount of polyolefin desirably added is between about 5 to 50 weight percent based on the rubbery copolymer. The addition of polyolefins in general enhances chemical stability, particularly resistance to ozone and is of benefit in aiding processing.

The general characteristics for a suitable hydrocarbon type plasticizer oil may be as follows or its equivalent.

| | Preferred | Minimum | Maximum |
|---|---|---|---|
| API° gravity | 15-30 | 10 | 35 |
| Flash Point, °F. (open cup method) | 500-550 | 300 | 700 |
| Pour Point, °F | 15-30 | 10 | 60 |
| SSU at 100° F | 100-12,000 | 50 | 20,000 |
| Iodine No. | 0-20 | 0 | 50 |

The vulcanization of the chlorinated butyl rubber or covulcanization of chlorinated butyl rubber with other rubbery materials according to the present invention may be at temperatures from between about room temperature to 500° F., advantageously about 200° F. to about 450° F., preferably at about 250° F. to 400° F. for from about several seconds up to about 5 days or more. Normally the vulcanization or convulcanization is from about 10 minutes to about 20 hours at about 200° F. to about 0.05-20.0 minutes at about 400° F. depending upon the nature and amount of the added rubber covulcanized with the chlorinated butyl rubber. For most uses, the optimum vulcanization conditions are from about 0.1 minute to 5 hours at about 250° to 400° F. depending upon the type of curatives used, type of chlorinated isoolefin-multiolefin-containing copolymer, and type of process required to fabricate the particular article of manufacture being produced. In general, the higher the vulcanization temperature, the shorter may be the vulcanizing time and vice versa.

For light-colored vulcanizates, the chlorinated butyl rubber copolymer is advantageously compounded into the following recipe or its equivalent:

Component: Parts by weight
Chlorinated butyl rubber _____ 100
Primary or polyfunctional amine vulcanization agent (e.g. n-decylamine) _____ 0.5-15.0
TiO₂ _____ 10-75
ZnO _____ 0-30
MgO and/or CaO _____ 0-30
Bluing agent (Ultramarine blue) _____ 0-2.0
Stearic acid _____ 0-2.0
Sulfur _____ 0-5.0

Suitable pigments, when employed in minor quantities in pastel butyl rubber composites, are as follows: calcium carbonate; ferric hydroxide; chrome-yellow; Prussian blue, phthalocyanine; etc. Conventional non-staining anti-oxidants, or even a slightly colored anti-oxidant such as phenyl beta naphthylamine, may be employed. However, the non-staining anti-oxidants which are particularly efficacious for white butyl vulcanizates comprise about 0.1 to 2.0 weight percent, based on total rubbery polymer of either alkylated aromatic hydrocarbons or alkylated cresols such as 2,6-ditertiary butyl para-cresol; bisphenols, such as bis (2-hydroxy-3-tertiary butyl-5-methyl phenyl) methane, amino phenols such as N-lauroyl p-amino phenol, or a $C_5$ to $C_9$ alkylated diphenylamine such as heptylated diphenylamine.

For dark colored vulcanizates about 100 parts by weight of the chlorinated butyl rubber copolymer is advantageously compounded with about:

| Component | Parts by Weight | |
|---|---|---|
| | General Range | Preferred Range |
| Primary or polyfunctional amine vulcanization agent (e.g. hexamethylene diamine) | 0-15.0 | 1-10 |
| Carbon black | 0-150 | 25-75 |
| Zinc oxide | 1-50 | 2-20 |
| Magnesium oxide | 0-50 | 2-20 |
| Sulfur | 0-10 | 0-5 |
| Mold release agent (e.g. stearic acid) | 0-5 | 0-2 |
| Anti-oxidant (e.g. N-lauroyl p-amino phenol) | 0-5 | 0-2 |

Others copolymers which are advantageously partially chlorinated with gaseous chlorine in accordance with the present invention, include copolymers of 4-methyl pentene-1, 2-ethyl butene-1, 4-ethyl pentene-1, or the like, as well as isobutylene, 2-methyl butene-1 or 3-methyl butene-1 with one or more of the following multiolefins:

(1) Acyclic or open-chain conjugated diolefins such as 3-methylpentadiene-1,3; hexadienes; 2-neopentyl-butadiene-1,3, and the like;

(2) Alicyclic diolefins, both conjugated and non-conjugated such as 1-vinyl cyclohexane-3, 1-vinyl cyclobutene-2, dicyclopentadiene; diolefinic terpenes such as dipentene, terpinenes, terpinoline, phellandrenes, sylvestrene and the like;

(3) Acyclic triolefins such as 2,6-dimethyl-4-methylene-2,5; 2-methyl hexatriene-1,3,5, and other conjugated triolefins such as ocimene;

(4) Alicyclic triolefins such as fulvene; 6,6-dimethyl fulvene; 6-phenyl fulvene; tertiary alkyl fulvenes; 1,3,3-trimethyl-6-vinylcyclohexadiene - 1,2; cycloheptatriene; etc.; and (5) Higher multiolefins such as 6,6-vinyl methyl fulvene (a tetraolefin) and 6,6-diisopropenyl fulvene (a pentaolefin).

It is also within the purview of the present invention to partially chlorinate, with gaseous chlorine, copolymers already containing a modicum of combined chlorine. The mole percent of combined chlorine initially present in the copolymer may vary between about 0.01 to 0.15, preferably about 0.02 to 0.10 times the mole percent unsaturation of the copolymer. Such copolymers, initially containing very small quantities of combined chlorine, may be produced by adding to the polymerization reaction mixture, comprising the various isoolefins and multiolefinic compounds (with or without a third or even a fourth ethylenic monomer) hereinbefore mentioned, a very small modifying quantity of a chlorine containing monoolefinic or multiolefinic compound. Such compounds include p-chloro styrene, dichlorostyrene or the like.

In order to more fully illustrate the present invention, the following experimental data are given.

EXAMPLE I

Three runs were made chlorinating butyl rubber. The butyl rubber employed in all instances was a commercial butyl rubber corresponding to GR-I-18 rubber. Such a rubber is produced by employing in the polymerization feed about 2.5 weight percent isoprene and about 97.5% isobutylene. The rubber had an eight minute Mooney viscosity at 212° F. of 71.0, a mole percent unsaturation of 1.47, and a viscosity average molecular weight of 420,000.

The chlorination of solutions of the above uncured butyl rubber was conducted in a 50 gallon glass lined Pfaudler reactor equipped with agitator and baffle. The solvent for the butyl rubber was as follows:

| Component: | Volume percent |
|---|---|
| 2,2-dimethyl butane | 0.1 |
| 2,3-dimethyl butane | 2.40 |
| 2-methyl pentane | 10.75 |
| 3-methyl pentane | 12.45 |
| n-Hexane | 44.85 |
| Methyl cyclopentane | 20.5 |
| 2,2-dimethyl pentane | 0.4 |
| Benzene | 7.7 |
| Cyclohexane | 0.85 |

Gaseous chlorine was continuously added to the butyl solutions over a period of 10 minutes at 30° C. and under atmospheric pressure. The chlorine was added to the reactor through a ⅜ inch stainless steel tube, one end of which was immersed below the liquid level of the agitated butyl rubber solutions. The agitated solutions were then allowed to stand for an additional 50 minutes.

The resulting solutions of chlorinated butyl rubber were then water-washed three times to remove dissolved hydrogen chloride. The solutions were then filtered to remove impurities as a precautionary measure.

The absolute amounts of butyl rubber, solvent, and chlorine added as well as the calculated percent of added chlorine based on polymer and resulting percent of chlorine combined in the polymer were as follows:

| Run No. | Pounds of Butyl Rubber | Gallons of Solvent | Ounces of Chlorine | Percent Chlorine Added | Percent Chlorine combined in the Polymer |
|---|---|---|---|---|---|
| 1 | 25 | 30 | 12 | 3 | 1.49 |
| 2 | 29 | 35 | 14 | 3 | 1.47 |
| 3[1] | 29 | 35 | 19 | 4.1 | 1.68 |

[1] The chlorination in Run No. 3 was accomplished employing as the butyl rubber solvent 30 gallons of the above solvent and 5 gallons of the same solvent containing additionally about 1.2 volume percent of mixed $C_6$ olefins.

The resulting water-washed solutions containing the chlorinated rubbery butyl products of runs 1, 2 and 3 were then mixed. The chlorinated butyl rubber was then recovered by injecting the dissolved chlorinated polymer into an agitated aqueous solution containing a commercial wetting agent of the aliphatic poly oxyethylene ether type (Sterox A.J.) in an amount of 64 cc. per 100 pounds of rubber as a dispersing aid. The solution also contained 1 pound of zinc stearate per 100 pounds of rubber and 0.2 pound of an antioxidant (2,6-di-tertiary butyl paracresol); the hot agitated aqueous solution being employed in an amount of 500 gallons per 100 pounds of rubber.

The agitated solution was maintained at a temperature between about 160° and 170° F. whereby to flash off the hydrocarbon solvent and form an aqueous slurry of the chlorinated butyl rubber in water. This slurry was then filtered and the chlorinated butyl which was in the form of a wet "crumb" was placed in a Proctor-Schwartz tray drier maintained at 210° F. and dried for 6 hours. The drier crumb depth on the tray was about ½ inch. The crumb was completely dried and compacted by milling for eight minutes on a conventional rubber mill having a roll temperature of 250° F.

One hundred parts by weight of the foregoing dry chlorinated butyl crumb were then compounded in a two roll commercial rubber mill at a roll temperature of 100° F. with the following:

| Component: | Parts by weight |
|---|---|
| Zinc oxide | 5 |
| Carbon black (SRF) | 50 |
| Stearic acid | 1 |

The resulting compounded chlorinated butyl rubber blend was then cured for 60 minutes at 287° F. in order to vulcanize the same. The following physical inspections were noted:

| | |
|---|---|
| Tensile strength (p.s.i.) | 2125 |
| Modulus at 300% elongation (p.s.i.) | 1265 |
| Elongation at break (percent) | 465 |

The foregoing data show that excellent physical properties are obtained by vulcanizing a butyl rubber chlorinated in accordance with the present invention and that chlorination in accordance with the invention does not degrade the polymer as demonstrated by the high tensile strength shown above.

Screening tests carried out using the individual chlorinated rubbers of this example (runs 1-3) indicated substantially equal physical properties for each of the three individual chlorinated rubbers.

EXAMPLES II-IV

An additional three runs were made chlorinating a GR-I-18 type butyl rubber dissolved in benzene. The chlorination of solutions of the uncured butyl rubbers was conducted in a 500-gallon glass-lined Pfaudler reactor equipped with an agitator, baffle, submersed stainless steel sparger ring and a conduit leading into said ring.

Gaseous chlorine was continuously added to the butyl rubber solutions over a period of one-half hour at a temperature level of 29° C. and under atmospheric pressure. The chlorine was added to the reactor through the conduit via the sparger ring which, as hereinbefore mentioned, was immersed below the liquid level of the agitated butyl rubber solutions. The chlorination was then terminated and the solutions containing the chlorinated butyl rubber formed agitated for an additional ten minutes. The resulting solutions of chlorinated butyl rubber were then water washed three times to remove dissolved hydrogen chloride. There was then added to each solution 0.2 pound per 100 pounds of chlorinated butyl rubber formed as a 10 weight percent solution in benzene of an antioxidant (2,6-di-tertiary butyl paracresol).

The absolute amounts of butyl rubber, benzene solvent and gaseous chlorine added, as well as the calculated percent of added chlorine based on polymer and resulting percent of chlorine combined in the polymer were as follows:

| Example | Pounds of Butyl Rubber | Pounds of Benzene Solvent | Pounds of Chlorine | Percent Chlorine added | Percent Chlorine combined in the Polymer |
|---|---|---|---|---|---|
| II | 190 | 1,740 | 5.5 | 2.9 | 1.23 |
| III | 193 | 1,760 | 5.6 | 2.9 | 1.22 |
| IV | 167 | 1,530 | 4.9 | 2.9 | 1.30 |

The resulting waterwashed solutions containing the chlorinated rubbery butyl products (Examples II, III, and IV) were then each recovered by injecting the dissolved chlorinated polymer into an agitated hot aqueous solution containing a commercial wetting agent of the aliphatic poly oxyethylene ether type (Sterox A.J.) in an amount of 0.6 lb. per 100 lbs. of chlorinated rubber as a dispersing aid. The solution also contained one pound of zinc stearate (an anti-tack agent) per 100 lbs. of chlorinated butyl rubber; the hot agitated aqueous solutions employed each containing 4,170 lbs. of water per 100 lbs. of chlorinated butyl rubber.

Each agitated solution was maintained at a temperature between about 190° and 210° F. (i.e. 88°–99° C.) whereby to flash off the benzene solvent and form an aqueous slurry of the chlorinated butyl rubber in water. This slurry was then filtered and each chlorinated butyl rubber (Examples II, III and IV) which was in the form of a wet "crumb" was placed in a Proctor and Schwartz tray drier maintained at 180° F. (i.e. 82° C.) and dried for ten hours. The crumb depth on the tray was about one-half inch. The crumb was then completely dried and compacted by milling for seven minutes on a conventional rubber mill having a roll temperature of 260° F. (i.e. 127° C.). The Mooney viscosities (8 minutes at 212° F.) for the modified copolymers of Examples II, III and IV, were 55, 56, and 64 respectively.

The chlorinated butyl rubber copolymers of Examples II, III and IV were compounded on a cold rubber mill into the following composition:

Component: Parts by weight
Chlorinated butyl rubber copolymer _____ 100
Carbon black (SRF) _____ 50
Zinc oxide _____ 5
Stearic acid _____ 1

The resulting compounded chlorinated butyl rubber blends of Examples II, III and IV were then cured for 60 minutes at 307° F.; the following physical inspections being noted:

| Property | Example II | Example III | Example IV |
|---|---|---|---|
| Tensile Strength (p.s.i.) | 1,840 | 2,000 | 1,975 |
| Modulus at 300% Elong. (p.s.i.) | 1,315 | 1,355 | 935 |
| Elongation (percent) | 395 | 405 | 495 |

The above data show that excellent physical properties are obtained by vulcanizing a butyl rubber with zinc oxide wherein the butyl rubber has been chlorinated by gaseous chlorine in accordance with the present invention. More particularly, the above data show that chlorination in accordance with the invention does not degrade the modified copolymers formed as demonstrated by the high tensile strength, modulus and elongation of each cured vulcanizate.

One hundred parts by weight of the chlorinated butyl rubber copolymers of Examples II and III were compounded on a cold rubber mill into the following composition:

Component: Parts by weight
Carbon black (SRF) _____ 50
Magnesium oxide _____ 5
Hexamethylene diamine _____ 2.2
Stearic acid _____ 1.0

The resulting compounded chlorinated butyl rubber blends of Examples II and III were then cured for 60 minutes at 307° F., the following physical inspections being noted:

| Property | Example II | Example III |
|---|---|---|
| Tensile Strength (p.s.i.) | 1,800 | 2,015 |
| Modulus at 300% Elong. (p.s.i.) | 1,400 | 1,670 |
| Elongation (percent) | 345 | 365 |

The foregoing data show that excellent physical properties are obtained by vulcanizing with an amino compound (e.g. hexamethylene diamine) a butyl rubber chlorinated by gaseous chlorine in accordance with the present invention. The above data also show that chlorination, in accordance with the present invention, does not degrade the butyl rubber copolymer as demonstrated by the high tensile strength, modulus and elongation of the resulting cured vulcanizates.

One particularly advantageous use for the chlorine-containing isoolefin-multiolefin rubbery copolymers such as butyl rubber of the present invention is in pneumatic tires of either the inner tube-containing variety or in tubeless type tires.

Referring now to the drawings, Figure 1 depicts a pneumatic tubeless tire which comprises a hollow toroidal type member which is substantially U-shaped in cross section by virtue of an open portion which extends around the inner periphery of the member. In other words, the tire is of a tubeless type structure which has a cross-section in the form of an open-bellied body with spaced terminal portions to define a member generally resembling a horseshoe. The terminal portions constitute bead portions 11—11 of the tire inside of which are a plurality of bead wires, adhesively imbedded and molded in a rubber. The outer surface of the bead portion is advantageously formed into an air-sealing means to aid in adhesion to rim 12 when the tire is inflated. Typical air sealing means may comprise a layer of rubber disposed on the outer surfaces of the bead portions. This layer will generally vary in thickness between about 0.02 to 0.5 inch and comprise a vulcanized rubber or rubbers having a relatively low compression or permanent set. Alternatively, the outer surfaces of the bead portions may contain a plurality of ribs or, if these surfaces are smooth, the tire rim may be roughened (for example by sand-blasting) and/or ribbed circumferentially or both circumferentially and radially in those areas where the outer surfaces of the tire bead portions contact the rim. In any of the foregoing types of sealing means, a gumbo, dope, or cement comprising a soft, tacky, rubbery composition may be applied to the outer surfaces of the bead portions and/or the tire rim prior to mounting the tire. In any case, the air sealing means advantageously contain the modified copolymers in accordance with the invention; the particular structural details of the tire or rim surfaces not constituting a part of the present invention. The outer surface of the tire also includes tread area 13 and sidewalls 14. The open portion of the horseshoe-shaped tire faces that portion of the inner circumference of the tire which is adjacent the said tread area 13 of the tire.

The remaining construction of the tire may vary according to conventional fabrication, but in general the tire is a multi-layered type of structure with an outer layer as hereinbefore mentioned. The layer next adjacent the outer layer comprises a carcass 15 which includes a rubber having incorporated therein a fabric composed of a plurality of cotton, rayon, nylon, or steel cords. The tire also includes an inner lining 16, advantageously made from rubber; e.g., a chlorine-containing iso-olefin-multiolefin rubber copolymer in accordance with the present invention, which has been at least partially vulcanized or covulcanized with other rubbery polymers for about one to 300 minutes at temperatures between about 100° and 400° F. This inner lining must be substantially impermeable to air. The above multi-layers, at least 3 in number, are conventionally bonded or otherwise adhered together, for example, by cementing and/or especially by vulcanizing to form a tire of a unitary structure.

The compositions comprising the chlorinated isoolefin-multiolefin-containing copolymers of the present invention may be employed generally throughout the tire. For example, as above mentioned, the inner lining 16 may comprise such a chlorine-containing modified rubbery copolymer. Alternatively, inner lining 16 may comprise unmodified butyl rubber which has been bonded to carcass 15 by an interposed tie-ply of a chlorinated isoolefin-multiolefin-containing copolymer which has been at least partially vulcanized or covulcanized with other rubbery polymers in the presence of polyvalent metal oxides such as zinc oxide and/or sulfur and/or sulfur-containing compounds and/or primary or polyfunctional amines and/or quinoid compounds such as paraquinone dioxime or paradinitrosobenzene, and preferably also containing per 100 parts by weight of chlorinated isoolefin-multiolefin-containing copolymer, about 25 to 150 parts by weight of a filler such as a carbon black and/or a mineral filler such as clay, silica, alumina, talc, diatomaceous earth or the like. Such an interposed tie-ply facilitates the inclusion of highly unsaturated rubbers such as natural rubber, GR–S rubber (rubbery butadiene-styrene copolymers), Buna-N rubber (rubbery butadiene-nitrile rubber), neoprene rubber (i.e., a rubbery polymer of chloroprene), mixtures thereof, etc. in the carcass.

The other layers of the tire such as the carcass layer and/or the outer layer (including the tread area, sidewalls, outer bead portions, etc.) may also comprise chlorinated isoolefin-multiolefin-containing copolymers, particularly ch'orinated butyl rubber, in accordance with the present invention. Vulcanization of the carcass, tie plies (if any), sidewalls, and tread area is advantageously accomplished by heating the same for times of between about 1 to 200, advantageously about 3 to 150, preferably about 10 to 100 minutes at temperatures between about 250° and 450° F., preferably between about 275° and 400° F. These layers may also contain in addition to the chlorinated isoolefin-multiolefin-containing copolymer, other rubbery polymers which have been co-vulcanized together.

The tubeless tire may also contain, in at least the tread area 13, an oil-extended high molecular weight (e.g., viscosity average molecular weight of about 900,000 to about 2,000,000) unmodified butyl rubber and/or chlorinated butyl rubber which has been bonded to either a highly saturated or unsaturated rubber or mixture of rubbers in carcass 15 by an interposed tread base and/or a tie-ply of a chlorinated isoolefin-multiolefin-containing copolymer, preferably chlorinated butyl rubber, in accordance with the present invention, which has been advantageously substantially completely vulcanized or co-vulcanized with other rubbery polymers.

Another advantageous use for the chlorinated isoolefin-multiolefin-containing copolymers, particularly chlorinated butyl rubber of the present invention is in the manufacture of curing bags, particularly tire curing bags. Figure 2 of the accompanying drawings illustrates a tire curing bag made of such a chlorinated isoolefin-multiolefin-containing copolymer, in accordance with the present invention, which has been advantageously compounded into the following recipe or its equivalent:

| Component | Parts by Weight | |
|---|---|---|
| | Typical Range | Preferred Range |
| Chlorinated isoolefin-multiolefin copolymer | 100 | 100 |
| Zinc Oxide | 2–20 | 5–15 |
| Filler [1] | 20–80 | 40–60 |
| Die-anti-tack agent (e.g. stearic acid) | 0–5 | 0.5–2.0 |
| Phenolic resin | 0–20 | 2–15 |

[1] The filler advantageously comprises any suitable non-oxy carbon black such as furnace or thermal blacks and/or mineral fillers such as clays, talc, alumina, silica, diatomaceous earth, etc.

The above compounded stock is shaped into the form of curing bag 17 in accordance with conventional practice and is then cured in a mold at temperatures between about 280° and 350° F. for a period of time ranging between about 10 minutes and 2 hours, the lower the temperature the longer the curing time and vice versa. Referring again to Figure 2, tire curing bag 17 is of an annular toroidal form having an external shape corresponding approximately to the interior contour of the pneumatic tire casing or inner liner to be cured thereon, and is equipped with the usual connecting valve 18 by means of which a heated fluid under pressure, such as hot water and/or steam is introduced into the interior cavity of the bag during the vulcanization of the tire. The tire curing bag is thereby expanded, causing the tire to conform closely to the surfaces of the mold cavity in which the tire is vulcanized. A tire curing bag generally has a wall thickness between about 0.25 to 2.5, preferably about 0.5 to 2.0 inches. Such a curing bag, produced in accordance with the present invention, is superior to conventional curing bags in its resistance to deteriorating influences.

Another advantageous use for the chlorinated isoolefin-multiolefin-containing rubbery copolymers of the present invention is in making tire casing curing diaphragms or bladders for Bag-O-Matic presses. Figure 3 shows such a hollow cylindrical curing bladder or diaphragm 19 useful in a Bag-O-Matic tire press. The top 20 and bottom 21 of the diaphragm are sealed when in position on the press by a combination of bead and clamping rings (not shown) which also form the bead area of the tire mold. A Bag-O-Matic tire press is illustrated and described on page 314 and pages 318 to 319 in "Machinery and Equipment for Rubber and Plastics," volume I; "Primary Machinery and Equipment" 1952, compiled by R. G. Seaman and A. M. Merrill) to which reference may be had for further details. The compounding of chlorinated butyl rubber for use in vulcanized curing diaphragms is essentially the same as for tire curing bags outlined above.

Other embodiments of the present invention comprise the use of chlorinated isoolefin-multiolefin-containing copolymers, particularly chlorinated butyl rubber in conveyor or transmission belting and steam hose. The excellent heat-aging resistance properties of chlorinated isoolefin-multiolefin rubbery copolymers (which have superior heat-aging resistance properties compared to either the corresponding brominated or unhalogenated isoolefin-multiolefin-containing copolymers) makes the chlorinated copolymers of the present invention particularly adaptable for use in steam hose and conveyor or transmission belting where, in each instance, either the transport of hot materials is involved or the type of service results in heating of the article.

Figure 4:
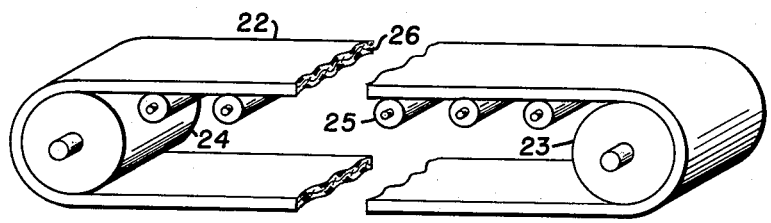
Figure 4 is a generally edgewise perspective view of a conveyor belt structure in which the belt is formed of a modified copolymer material in accordance with the present invention.

Figure 4 shows a conveyor belt 22 containing a chlorinated rubbery isoolefin-multiolefin-containing copolymer in accordance with the present invention, said belt being in position on drive roller 23, idle roller 24, and idle support rollers 25. The belt may consist wholly of a chlorinated isoolefin-multiolefin-containing rubbery copolymer, particularly chlorinated butyl rubber, in accordance with the present invention, but preferably contains embedded therein a fabric 26 composed of a plurality of plies of cotton, rayon, nylon or steel filaments, cords or threads. A suitable formulation for compounding chlorinated isoolefin-multiolefin-containing copolymers for use in either conveyor belting or in steam hose is as follows:

| Component | Parts by Weight | |
|---|---|---|
| | Typical Range | Preferred Range |
| Chlorinated isoolefin-multiolefin copolymer | 100 | 100 |
| Zinc Oxide | 2–20 | 5–15 |
| Filler [1] | 30–120 | 50–80 |
| Die-anti-tack agent (e.g., stearic acid) | 0–5 | 0.5–2.0 |
| Phenolic resin | 0–20 | 2–15 |

[1] The filler may comprise oxy or non-oxy carbon blacks such as channel, furnace or thermal blacks and/or mineral fillers such as clays, talk, alumina, silica, silica-alumina, diatomaceous earth, etc.

Figure 5:
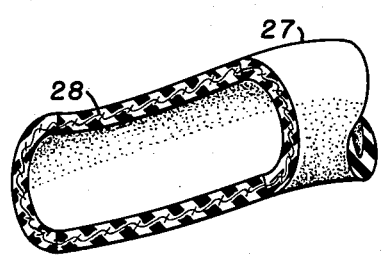
Figure 5 is a perspective view, partly in section, of a portion of a typical steam hose formed of a composition comprising a modified copolymer in accordance with the present invention.

Figure 5 shows a central longitudinal section broken away of a portion of a flexible rubber steam hose 27 produced in accordance with the present invention. Again, as in the case of the conveyor belt, the steam hose may consist wholly of chlorinated butyl rubber, but preferably contains embedded therein a cotton, rayon, nylon, or steel fabric 28.

The expression "layer" as employed in the claims is intended to include plies and liners as well as such layers as the carcass, sidewalls, tread area, etc., of tires.

The compositions comprising chlorinated isoolefin-multiolefin rubbery copolymers, particularly chlorinated butyl rubber in accordance with the present invention, may be employed alone or in admixture with other rubbers for a wide variety of applications other than those mentioned hereinbefore such as in electrical insulation, inner tubes, blown sponge rubber, car window channel strips, proofed goods, general molded mechanical goods and other applications where butyl rubber, certain chloro-alkadiene rubbery homopolymers or copolymers and other rubberlike polymers have utility.

Resort may be had to various modifications and variations of the present invention without departing from the spirit or scope of the appended claims.

What is claimed is:

1. A process for producing a chlorinated isoolefin-multiolefin butyl rubber copolymer of improved vulcanizing and heat aging characteristics which comprises chlorinating at a temperature between about 20° and 70° C. with gaseous chlorine, a solution in a substantially inert solvent, of an unvulcanized isoolefin-multiolefin butyl rubber copolymer to contain at least about 0.5 weight percent chlorine, but not more than about one atom of combined chlorine per double bond in the copolymer, the amount of chlorine added to the copolymer being approximately twice that which is desired to be combined with said copolymer.

2. Process according to claim 1 wherein the butyl rubber comprises a copolymer containing about 85 to 99.5 weight percent of a $C_4$ to $C_7$ isoolefin and about 0.5 to 15.0 weight percent of a $C_4$ to $C_8$ conjugated diolefin, the amount of resulting chlorine combined with the butyl rubber being at least 0.5 weight percent but not more than about "X" weight percent chlorine wherein "X" equals:

$$\frac{35.46L}{(100-L)M_1 + L(M_2+35.46)} \times 100$$

and $L$=mole percent of the diolefin in the copolymer
$M_1$=molecular weight of the isoolefin
$M_2$=molecular weight of the diolefin and
35.46=atomic weight of chlorine.

3. Process according to claim 1 in which the solvent comprises at least one substantially inert hydrocarbon; the ratio between the solvent and dissolved isoolefin-multiolefin butyl rubber copolymer being between about 20–99:1–80 weight percent, respectively.

4. Process according to claim 3 in which the hydrocarbon solvent is selected from the group consisting of $C_4$ to $C_{12}$ paraffins, $C_6$ to $C_{18}$ aromatic hydrocarbons, $C_3$ to $C_{12}$ cycloparaffins, and mixtures thereof.

5. Process according to claim 3 in which the hydrocarbon solvent comprises n-hexane.

6. Process according to claim 3 in which the hydrocarbon solvent comprises benzene.

7. Process according to claim 3 in which the hydrocarbon solvent comprises a methyl pentane.

8. An improved process of vulcanizing an isoolefin-multiolefin butyl rubber copolymer which comprises dissolving the unvulcanized copolymer in about 20 to 95 weight percent of a substantially inert hydrocarbon solvent; reacting the copolymer at a temperature between about 20° and 70° C. with gaseous chlorine to contain at least about 0.5 weight percent chlorine but not more than about one combined atom of chlorine per double bond in the copolymer, the amount of chlorine added to the copolymer being approximately twice that which is desired to be combined with said copolymer, compounding 100 parts by weight of the resulting chlorinated isoolefin-multiolefin butyl rubber copolymer formed with about 1 to 10 parts by weight of an organic amine, about 25 to 75 parts by weight of a carbon black, and curing the resulting composite at about 200° to 450° F. for a time sufficient to vulcanize the same.

9. A process according to claim 8 in which the solvent comprises at least one $C_4$ to $C_7$ substantially inert hydrocarbon.

References Cited in the file of this patent

UNITED STATES PATENTS

| | | |
|---|---|---|
| 2,631,984 | Crawford et al. | Mar. 17, 1953 |
| 2,732,354 | Morrissey et al. | Jan. 24, 1956 |
| 2,804,448 | Hallenbeck | Aug. 27, 1957 |